(12) United States Patent
Kitaguchi et al.

(10) Patent No.: US 9,632,524 B2
(45) Date of Patent: Apr. 25, 2017

(54) VEHICLE PEDAL BRACKET AND VEHICLE OPERATION PEDAL DEVICE

(71) Applicants: Kazuaki Kitaguchi, Toyota (JP); Masataka Nakane, Toyota (JP)

(72) Inventors: Kazuaki Kitaguchi, Toyota (JP); Masataka Nakane, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/772,730

(22) PCT Filed: Jul. 2, 2013

(86) PCT No.: PCT/JP2013/068183
§ 371 (c)(1),
(2) Date: Sep. 3, 2015

(87) PCT Pub. No.: WO2014/136283
PCT Pub. Date: Sep. 12, 2014

(65) Prior Publication Data
US 2016/0018842 A1 Jan. 21, 2016

(30) Foreign Application Priority Data
Mar. 6, 2013 (JP) .................................. 2013-044231

(51) Int. Cl.
*G05G 1/30* (2008.04)
*B60T 7/06* (2006.01)
(Continued)

(52) U.S. Cl.
CPC ................... *G05G 1/30* (2013.01); *B60T 7/06* (2013.01); *G05G 1/506* (2013.01); *G05G 1/44* (2013.01)

(58) Field of Classification Search
CPC ...................................... G05G 1/30; B60T 7/06
See application file for complete search history.

(56) References Cited

U.S. PATENT DOCUMENTS 3,367,208 A * 2/1968 Fender .................... B60T 7/045
74/531
4,872,368 A * 10/1989 Porter ..................... B60T 7/047
74/512

(Continued)

FOREIGN PATENT DOCUMENTS

JP H03-30114 U 3/1991
JP DE 10028117 A1 * 12/2000 .............. B60T 7/065

OTHER PUBLICATIONS

Nov. 4, 2015 Japanese Office Action issued in Japanese Patent Application No. 2013-044231.
(Continued)

*Primary Examiner* — Vicky Johnson
(74) *Attorney, Agent, or Firm* — Oliff PLC (57) ABSTRACT

A vehicle pedal bracket, including a pair of bracket halves disposed on right and left sides of an operation pedal and joined by placing joint portions thereof parallel and on top of each other so that the joint portions surface contact each other, and the vehicle pedal bracket being fixed to a vehicle body via attachment portions of the pair of bracket halves, the joint portions protruding from the bracket halves formed by a sheet material and at least one of the joint portions bent into a crank shape and placed on top of each other so as to surface contact each other, the joint portions being provided at least at two positions located on both sides of the attachment portions in a vertical direction of a vehicle, and the joint portion which is located below the attachment portions being provided to protrude toward the front of the vehicle.

4 Claims, 9 Drawing Sheets

(51) Int. Cl.
G05G 1/50 (2008.04)
G05G 1/44 (2008.04)

(56) References Cited

U.S. PATENT DOCUMENTS

| | | | | |
|---|---|---|---|---|
| 5,182,963 A * | 2/1993 | Perisho | ............... | B60T 7/047 188/2 D |
| 5,533,420 A * | 7/1996 | Perisho | ............... | B60T 7/047 74/501.5 R |
| 6,880,426 B2 * | 4/2005 | Gross | ............... | B60T 7/047 384/416 |
| 2010/0107804 A1 | 5/2010 | Tervol et al. | | |

OTHER PUBLICATIONS

Sep. 3, 2013 International Search Report issued in International Patent Application No. PCT/JP2013/068183.
Apr. 5, 2016 Office Action issued in Chinese Patent Application No. 201380074203.9.
Dec. 6, 2016 Office Action issued in Chinese Patent Application No. 201380074203.9.

* cited by examiner

VEHICLE PEDAL BRACKET AND VEHICLE OPERATION PEDAL DEVICE

TECHNICAL FIELD

The present invention relates to a vehicle pedal bracket, and more particularly to an improvement in vehicle pedal bracket having a pair of bracket halves that are disposed on the right and left sides of an operation pedal.

BACKGROUND ART

A vehicle pedal bracket has been proposed which has a pair of bracket halves that are disposed on the right and left sides of an operation pedal and that are joined together by placing joint portions parallel to each other on top of each other so that the joint portions surface contact each other, and which is fixed to a vehicle body via attachment portions of the pair of bracket halves. A device described in Patent Document 1 is an example of such a vehicle pedal bracket, in which a joint portion (bent portion 11c) is provided at a position closer to the front of the vehicle than the operation pedal, and the bracket halves are joined together at the joint portion by clinch pins. Such a vehicle pedal bracket facilitates the operation of attaching the operation pedal.

RELATED ART DOCUMENT

Patent Document

Patent Document 1: Japanese Utility Model Application Publication No. H03-30114

SUMMARY OF THE INVENTION

Problems to be Solved by the Invention

In the vehicle pedal bracket described in Patent Document 1, however, the bracket halves are joined together only at one location at a position closer to the front of the vehicle than the operation pedal. It is therefore difficult due to dimensional variation of each part etc. to ensure positional accuracy of the attachment portions that are fixed to the vehicle body.

The present invention was developed in view of the above circumstances, and it is an object of the present invention to improve positional accuracy of attachment portions of a pair of bracket halves in a vehicle pedal bracket in which the pair of bracket halves are joined together.

Means for Solving the Problem

To achieve the object, the first aspect of the invention provides a vehicle pedal bracket, which (a) has a pair of bracket halves that are disposed on right and left sides of an operation pedal and that are joined together by placing joint portions parallel to each other on top of each other so that the joint portions surface contact each other, and which (b) is fixed to a vehicle body via attachment portions of the pair of bracket halves, characterized in that (c) the joint portions protrude from the pair of bracket halves formed by a sheet material and at least one of the joint portions is bent into a crank shape and are placed on top of each other so as to surface contact each other, (d) the joint portions are provided at least at two positions located on both sides of the attachment portions in a vertical direction of a vehicle, and (e) the joint portion which is located below the attachment portions is provided so as to protrude toward the front of the vehicle.

The second aspect of the invention provides the vehicle pedal bracket recited in the first aspect of the invention, characterized in that at least one of the joint portions that are placed on top of each other has a restricting wall that is bent toward the other joint portion and that is engaged with the other joint portion to position the joint portions.

The third aspect of the invention provides a vehicle operation pedal device, characterized in that a support pin is disposed so as to penetrate the pair of bracket halves of the vehicle pedal bracket recited in the first or second aspect of the invention, and the operation pedal is pivotally disposed about an axis of the support pin.

Effects of the Invention

In the vehicle pedal bracket recited in the first aspect of the invention, the joint portions are provided at two positions located on both sides of the attachment portions in the vertical direction of the vehicle, and the pair of bracket halves are joined together by joining the joint portions. This can ensure high positional accuracy of the attachment portions while maintaining operability in attaching the operation pedal. The vehicle pedal bracket can thus be appropriately attached to the vehicle body via the attachment portions.

In the second aspect of the invention, at least one of the joint portions that are placed on top of each other has the restricting wall, and the joint portions are positioned by engaging the restricting wall with the other joint portion. Positional accuracy of the joint portions can thus be easily ensured. This further improves positional accuracy of the attachment portions of the bracket halves.

In the third aspect of the invention, the operation pedal is pivotally disposed so as to be supported by the pair of bracket halves of the vehicle pedal bracket recited in the first or second aspect of the invention, via the support pins. The third aspect of the invention has functions and effects similar to those of the first or second aspect of the invention.

MODES FOR CARRYING OUT THE INVENTION

The present invention is preferably applied to brake pedal devices for service brakes, but is also applicable to operation pedal devices for accelerator pedals, parking brakes, and clutches. The present invention may also be applied to various vehicle operation pedal devices such as a vehicle operation pedal device in which an intermediate lever is coupled to an operation pedal via a coupling link and a vehicle operation pedal device provided with a sensor for detecting an operating force or an operation stroke.

For example, when the pair of bracket halves are formed by pressing a sheet metal material, at least one of the joint portions that are placed on top of each other so as to surface contact each other is bent into a crank shape so that the joint portions protrude from the bracket halves and extend parallel to each other so as to surface contact each other. A simple, reliable method for joining the joint portions together is clinching. However, various joining means can be used such as crimping of the edges of the joint portions, clinch pins, spot welding, arc welding, etc. A clinch pin may be used as the support pin that pivotally supports the operation pedal, and joining of the joint portions by clinching etc. and clinching of the support pin may be performed simultaneously.

For example, it is desirable that the attachment portions of the pair of bracket halves be provided so as to be mirror images of each other. However, the attachment portions may be provided at positions shifted from each other in the vertical or longitudinal direction of the vehicle. The joint portions need only to be provided on both sides of the attachment portions in the vertical direction of the vehicle so as not to interfere with the attachment portions. The joint portions are provided at least at the two positions located on both sides of the attachment portions in the vertical direction of the vehicle. However, as necessary, the joint portion may also be provided in a region located away from the attachment portions. For example, if the joint portions are provided at two positions located above and below the attachment portions and located closer to the front of the vehicle than the operation pedal, it is desirable for improved rigidity of the pedal bracket to provide the joint portion also at a position closer to the rear of the vehicle, namely closer to the driver's seat, than the operation pedal. It is desirable that the pair of joint portions provided on both sides of the attachment portions in the vertical direction of the vehicle adjoin the attachment portions.

The restricting wall of the second aspect of the invention is intended to position the joint portions, which are parallel to each other and surface contact each other, in a two-dimensional direction along the surfaces of the joint portions. The joint portions may be positioned merely in one direction of two dimensions by a single flat restricting wall, but may be positioned to a fixed position in a two-dimensional plane by a pair of restricting walls crossing each other at a predetermined angle. This restricting wall may be provided in the joint portion that is provided at one position, but may be provided in each of the joint portions that are provided at a plurality of positions. Such a restricting wall is not necessarily required to carry out other aspects of the invention.

For example, each of the attachment portions of the pair of bracket halves is provided at a position closer to the front of the vehicle than the operation pedal. However, each of the attachment portions may be provided at a position located in front of and obliquely above the operation pedal etc. The attachment portions of the pair of bracket halves may be provided at different positions from each other. In this case, the joint portions can be provided at least at two positions located on both sides of one of the attachment portions in the vertical direction of the vehicle. The expression "both sides of the attachment portion(s) in the vertical direction of the vehicle" means any positions that are separated from each other in the vertical direction of the vehicle with the attachment portion(s) interposed therebetween, and may be shifted from each other in the longitudinal direction of the vehicle.

EMBODIMENTS

Embodiments of the present invention will be described in detail below with reference to the accompanying drawings.

Figure 1:
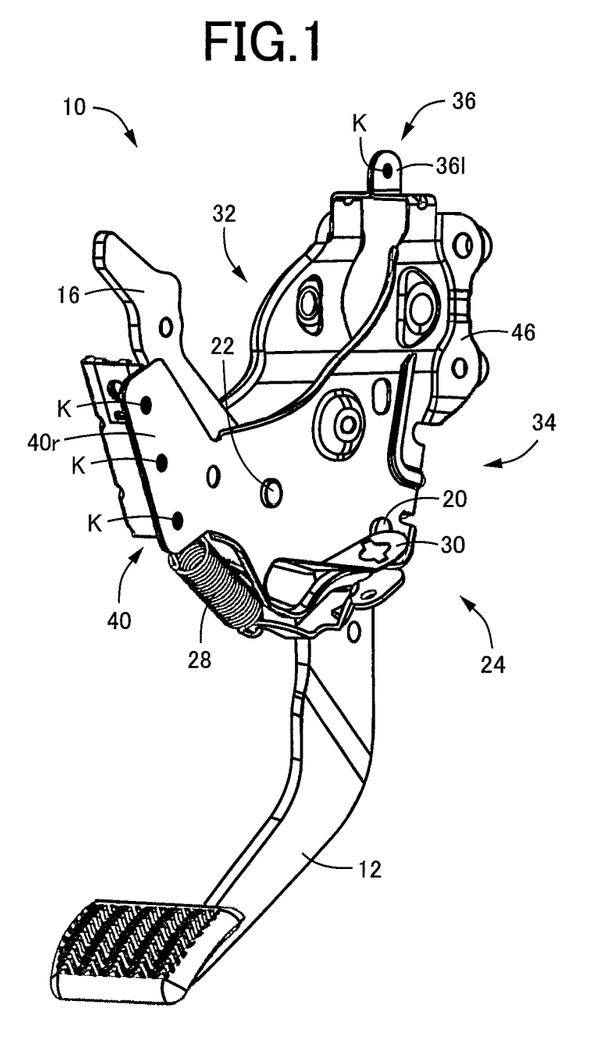
FIG. 1 is a perspective view showing an example of an operation pedal device for a service brake for a vehicle to which the present invention is applied.
Figure 2:
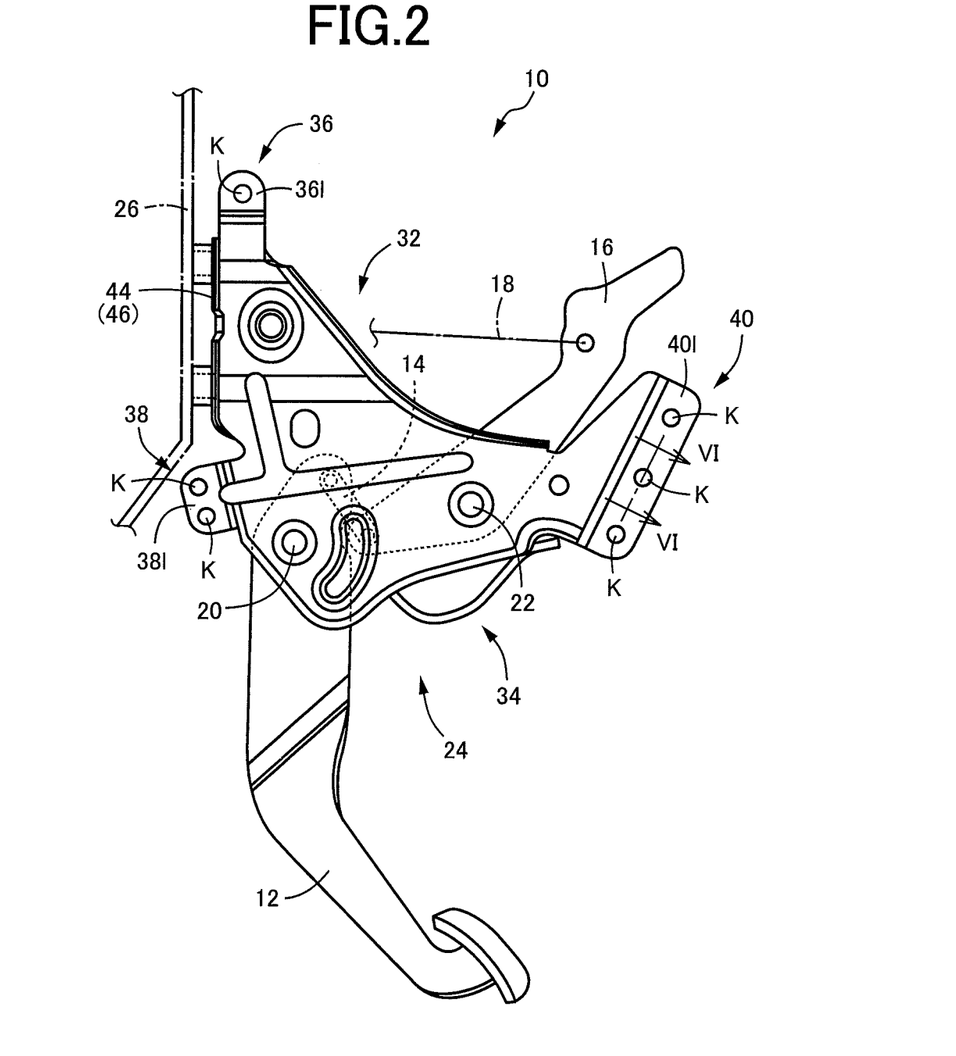
FIG. 2 is a side view of the vehicle operation pedal device illustrated in FIG. 1 as viewed from the left side of the vehicle.
Figure 3:
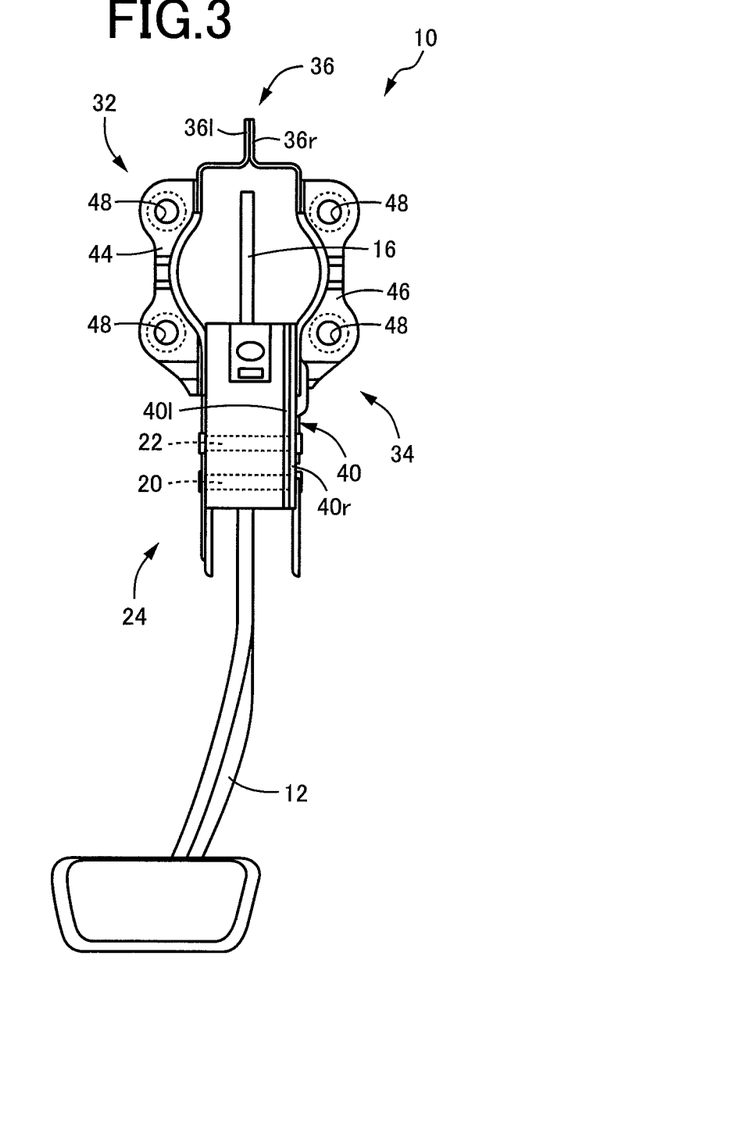
FIG. 3 is a front view of the vehicle operation pedal device illustrated in FIG. 1 as viewed from the rear side (driver's seat side) of the vehicle.

FIG. 1 is a perspective view showing an operation pedal device 10 for a service brake for a vehicle according to an embodiment of the present invention. FIG. 2 is a side view of the vehicle operation pedal device 10 as viewed from the left side of the vehicle, in which the upper side in FIG. 2 corresponds to the upper side of the vehicle, and the left direction in FIG. 2 corresponds to the front side of the vehicle. FIG. 3 is a front view of the vehicle operation pedal device 10 as viewed from the rear side (driver's seat side) of the vehicle. The vehicle operation pedal device 10 includes an operation pedal 12 that is depressed by a driver, and an intermediate lever 16 operatively coupled to the operation pedal 12 via a coupling link 14, so that a brake operating force is transmitted from the intermediate lever 16 to an operating rod 18 of a brake booster. The operation pedal 12 and the intermediate lever 16 are pivotally supported by a pedal bracket 24 via support pins 20, 22 about the axes of the support pins 20, 22, respectively, and the vehicle operation pedal device 10 is mounted on a vehicle body (dash panel etc.) 26 via the pedal bracket 24 in such an attitude that the support pins 20, 22 extend substantially horizontally. A return spring 28 is disposed between the operation pedal 12 and the pedal bracket 24 (see FIG. 1), so that the depressed operation pedal 12 is returned to its original position by biasing force of the return spring 28. The original position of the operation pedal 12 is defined by a stopper 30 etc. provided on the pedal bracket 24. The return spring 28 and the stopper 30 are not shown in FIGS. 2 and 3.

Figure 4:
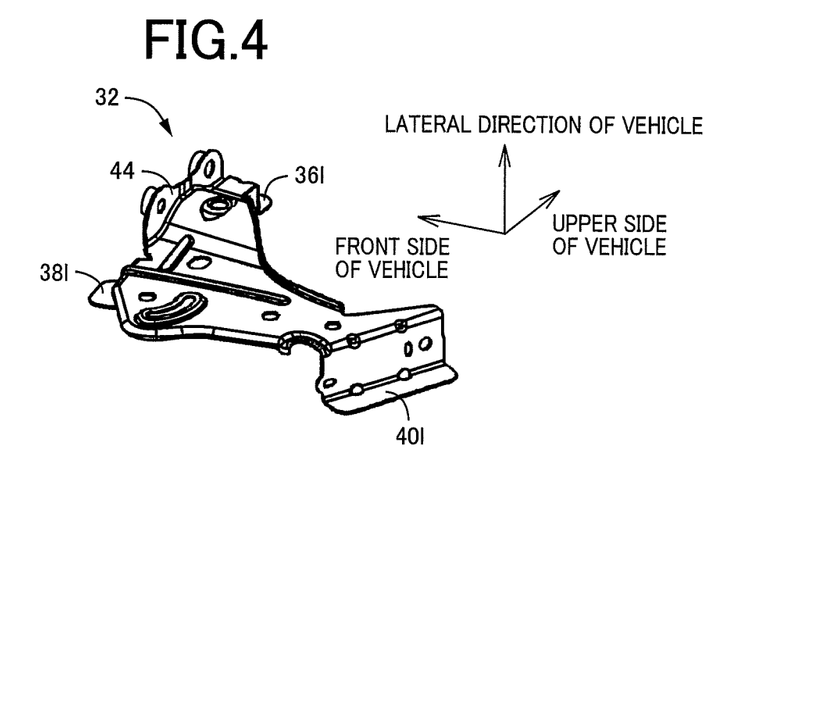
FIG. 4 is a perspective view of a left bracket half of the vehicle operation pedal device illustrated in FIG. 1 as viewed from the outside.
Figure 5:
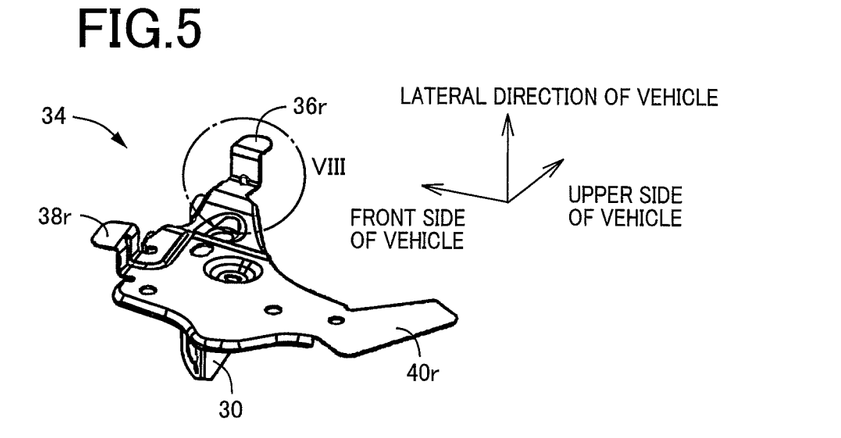
FIG. 5 is a perspective view of a right bracket half of the vehicle operation pedal device illustrated in FIG. 1 as viewed from the inside.

The pedal bracket 24 is mainly formed by a pair of right and left bracket halves 34, 32 disposed on the right and left sides of the operation pedal 12, and the support pins 20, 22 are disposed so as to penetrate the bracket halves 32, 34 on both sides. FIG. 4 is a perspective view of the left bracket half 32 as viewed from the outside, and FIG. 5 is a perspective view of the right bracket half 34 as viewed from the inside. These bracket halves 32, 34 are formed by pressing a sheet metal material, and together form a substantially bilaterally symmetrical shape. The bracket halves 32, 34 are placed on top of each other so as to surface contact each other at three joint portions 36, 38, 40 extending parallel to each other, and are joined together at the joint portions 36, 38, 40 to form the pedal bracket 24. The joint portion 36 is formed by joint portions 36*l*, 36*r* protruding upward from the bracket halves 32, 34 and bent into a crank shape. The joint portions 36*l*, 36*r* are placed on top of each other so as to face each other and are joined together. The joint portion 38 is also formed by joint portions 38*l*, 38*r* protruding toward the front of the vehicle from the bracket halves 32, 34 and bent into a crank shape. The joint portions 38*l*, 38*r* are placed on top of each other so as to face each other and are joined together. The joint portion 40 is formed by placing a joint portion 40*l* protruding toward the rear of the vehicle from the left bracket half 32 and bent into a crank shape, on top of a flat joint portion 40*r* provided in the right bracket half 34 so as to protrude toward the rear of the vehicle, and joining the joint portions 40*l*, 40*r* together.

Figure 6:
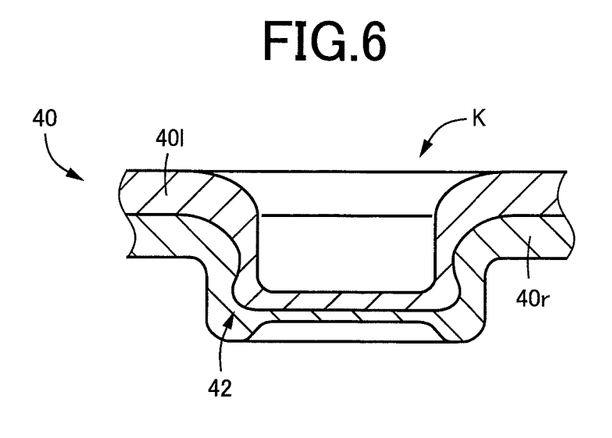
FIG. 6 is an enlarged sectional view of a clinch portion clinched in a joint portion so as to join a pair of bracket halves, taken along line VI-VI and viewed in the direction shown by arrows in FIG. 2.

The joint portions 36*r*, 36*l*, 38*r*, 38*l*, 40*r*, 40*l* of each joint portion 36, 38, 40 are joined together by clinching one to three clinch portions K. FIG. 6 is an enlarged sectional view of the clinch portion K clinched in the joint portion 40, taken along line VI-VI and viewed in the direction shown by arrows in FIG. 2. The joint portions 40*r*, 40*l* are firmly joined together by forming an undercut 42 by double clinching, namely by clinching (drawing) the clinch portion K first from above and then from below.

The bracket halves 32, 34 further have attachment portions 44, 46 at their front ends that are located closer to the front of the vehicle than the operation pedal 12. The attachment portions 44, 46 protrude outward in the lateral direction so as to be mirror images of each other. Each attachment portion 44, 46 has a pair of insertion holes 48 that are separated from each other in the vertical direction. Attachment bolts etc. for the brake booster are inserted through the total of four insertion holes 48, whereby the attachment portions 44, 46 are fixedly attached to the vehicle body 26. Each attachment portion 44, 46 has spacers formed integrally with the attachment portion 44, 46 at the openings of the insertion holes 48 which are adjacent to the vehicle body 26. The attachment portions 44, 46 are thus fixed to the vehicle body 26 with the spacers interposed therebetween.

As can be seen from FIG. 2, the joint portion 36 is provided in a region adjoining the upper sides of the attachment portions 44, 46, and the joint portion 38 is provided in a region adjoining the lower sides of the attachment portions 44, 46. Joining the joint portions 36*r*, 36*l*, 38*r*, 38*l* of the joint portions 36, 38 can therefore ensure high positional accuracy of the attachment portions 44, 46, namely high positional accuracy of the four insertion holes 48. The remaining joint portion 40 is provided in a region located on the opposite side of the support pins 20, 22 from the joint portions 36, 38, namely located closer to the rear of the vehicle than the operation pedal 12 and the intermediate lever 16, and located farthest from the attachment portions 44, 46 toward the rear of the vehicle. Joining the joint portions 36*r*, 36*l*, 38*r*, 38*l*, 40*r*, 40*l* of the joint portions 36, 38, 40 ensures rigidity of the pedal bracket 24 and allows the operation pedal 12 and the intermediate lever 16 to be reliably and stably supported in a predetermined attitude via the support pins 20, 22.

Figure 7A:
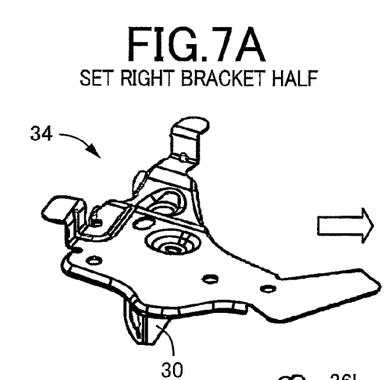
FIGS. 7A to 7E show process charts illustrating how to assemble the vehicle operation pedal device illustrated in FIG. 1.
Figure 7B:
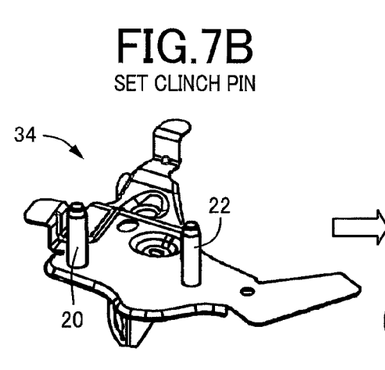
Figure 7C:
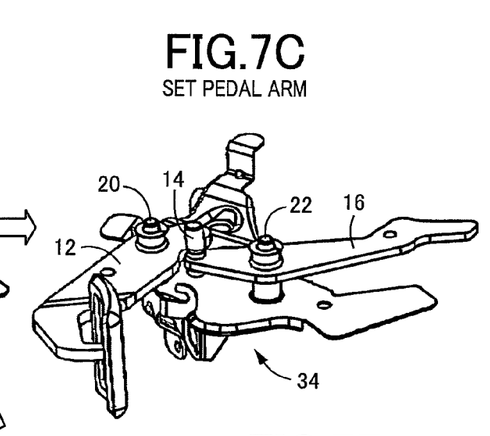
Figure 7D:
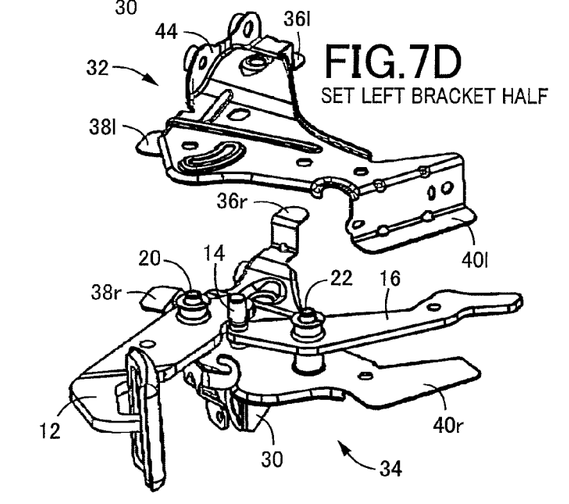
Figure 7E:
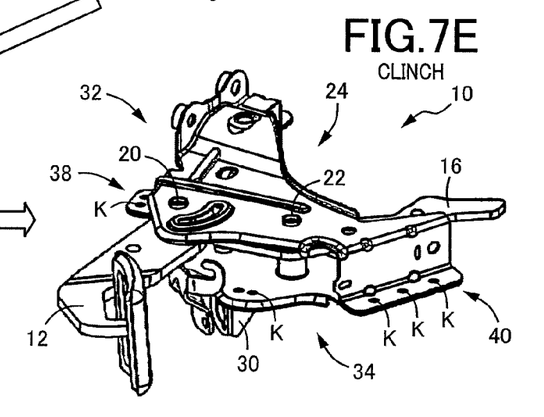

FIGS. 7A-7E show process charts illustrating how to assemble such a vehicle operation pedal device 10. In FIG. 7A, the right bracket half 34 is set in a clinching press machine, not shown, so as to face upward. At this time, the stopper 30 as a separate member from the right bracket half 34 is also placed at a predetermined attachment position on the lower side of the right bracket half 34. In FIG. 7B, the support pins 20, 22 are placed in attachment holes of the right bracket half 34. In FIG. 7C, the operation pedal 12 and the intermediate lever 16 are set on the support pins 20, 22. The operation pedal 12 and the intermediate lever 16 have been coupled in advance via the coupling link 14. In FIG. 7D the left bracket half 32 is placed so as to cover the right bracket half 34 from above so that the ends of the support pins 20, 22 are inserted in attachment holes of the left bracket half 32 and the joint portions 36*r*, 36*l*, 38*r*, 38*l*, 40*r*, 40*l* of the three joint portions 36, 38, 40 are placed on top of each other. In the clinching step of FIG. 7E clinching of the pair of support pins 20, 22 and joining of the three joint portions 36, 38, 40 by clinching are simultaneously performed with the press machine. The stopper 30 is also simultaneously joined to the right bracket half 34 by clinching. Thereafter, the return spring 28 etc. is attached, whereby the vehicle operation pedal device 10 for the purpose shown in FIG. 1 is produced.

As described above, in the vehicle operation pedal device 10 of the present embodiment, the pedal bracket 24 is mainly formed by the pair of bracket halves 32, 34. This facilitates operation of attaching the operation pedal 12 etc. as shown in FIGS. 7A-7E. Moreover, in this pedal bracket 24, the attachment portions 44, 46 are provided on the front side of the vehicle, and the joint portions 36, 38 are provided at two positions located on both sides of the attachment portions 44, 46 in the vertical direction of the vehicle and adjoining the attachment portions 44, 46, and the pair of bracket halves 32, 34 are joined together by joining the joint portions 36*r*, 36*l*, 38*r*, 38*l* of the joint portions 36, 38. This can ensure high positional accuracy of the attachment portions 44, 46 while maintaining operability in attaching the operation pedal 12 etc. The vehicle operation pedal device 10 can thus be appropriately attached to the vehicle body 26 via the attachment portions 44, 46.

In the present embodiment, in addition to the joint portions 36, 38, the joint portion 40 is also provided in the region located closer to the rear of the vehicle than the operation pedal 12 and located farthest from the attachment portions 44, 46 toward the rear of the vehicle, and the joint portions 40*r*, 40*l* of the joint portion 40 are joined together. This improves rigidity of the pedal bracket 24. The operation pedal 12 and the intermediate lever 16 can thus be reliably and stably supported in a predetermined attitude via the support pins 20, 22.

Other embodiments of the present invention will be described below. In the following embodiments, substantially the same portions as those of the above embodiment are denoted with the same reference characters as those of the above embodiment, and detailed description thereof will be omitted.

Figure 8:
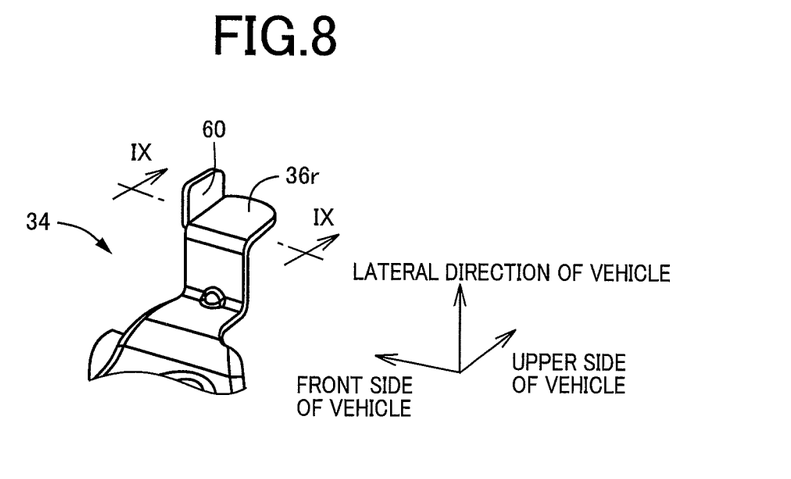
FIG. 8 is a perspective view corresponding to a portion VIII in FIG. 5, illustrating another example of the joint portion provided in the right bracket half of the present invention.
Figure 9A:
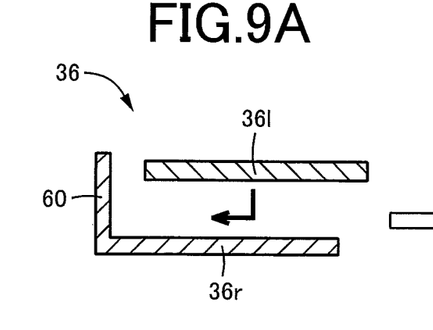
FIGS. 9A and 9B show enlarged sectional views taken along line IX-IX and viewed in the direction shown by arrows in FIG. 8, illustrating how to place the pair of joint portions on top of each other.
Figure 9B:
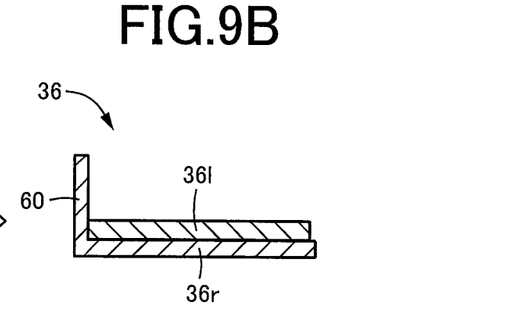

FIG. 8 is a perspective view corresponding to a portion VIII in FIG. 5, showing another example of the joint portion 36*r* provided in the right bracket half 34. A restricting wall 60 bent substantially at right angles in the left direction of the vehicle, namely toward the left bracket half 32, is provided along one edge (edge on the front side of the vehicle) of the joint portion 36r which extends in the vertical direction of the vehicle. FIGS. 9A and 9B show enlarged sectional views taken along line IX-IX and viewed in the direction shown by arrows in FIG. 8, illustrating how to place the pair of joint portions 36r, 36l on top of each other. First, the joint portion 36l of the left bracket half 32 is placed on the joint portion 36r of the right bracket half 34 so as to surface contact the joint portion 36r. In this state, the joint portion 36l is then slid to the left in the figure to contact the restricting wall 60. The joint portions 36r, 36l can thus be positioned in the longitudinal direction of the vehicle.

As described above, in the present embodiment, one of the joint portions 36r, 36l that are placed on top of each other, namely the joint portion 36r, has the restricting wall 60, and the joint portions 36r, 36l are positioned by engaging the restricting wall 60 with an edge of the other joint portion 36l. Positional accuracy of the joint portions 36r, 36l can thus be easily ensured. This further improves positional accuracy of the attachment portions 44, 46 of the bracket halves 32, 34.

Figure 10:
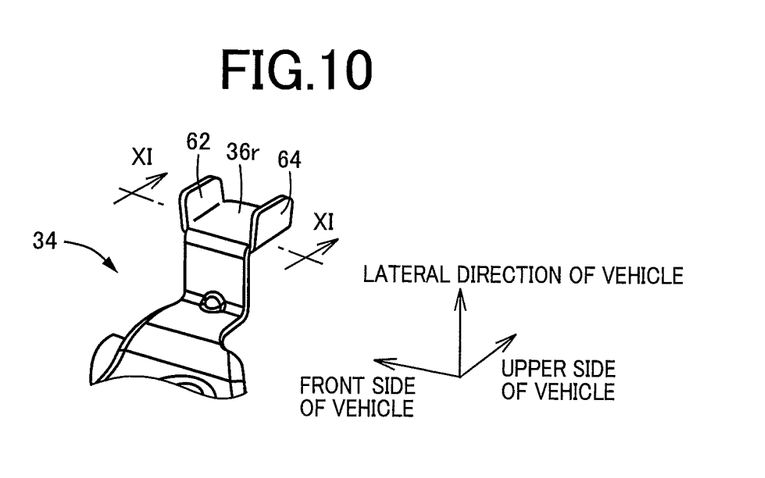
FIG. 10 is a perspective view corresponding to FIG. 8, illustrating a further example of the joint portion provided in the right bracket half of the present invention.
Figure 11A:
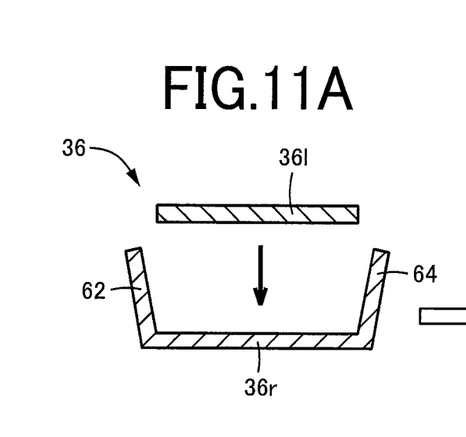
FIGS. 11A and 11B show enlarged sectional views taken along line XI-XI and viewed in the direction shown by arrows in FIG. 10, illustrating how to place the pair of joint portions on top of each other.
Figure 11B:
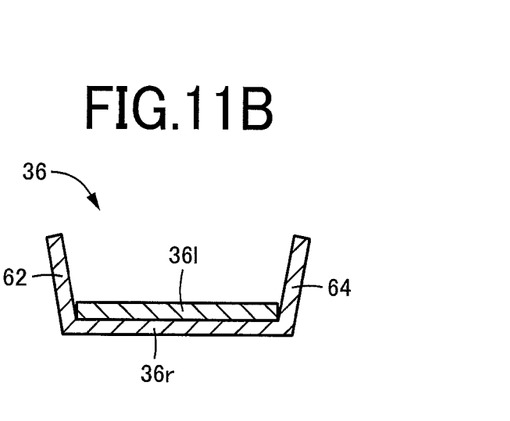

FIG. 10 is a perspective view corresponding to FIG. 8. In this embodiment, restricting walls 62, 64 bent toward the left bracket half 32 are provided along both edges of the joint portion 36r which extend in the vertical direction of the vehicle. FIGS. 11A and 11B show enlarged sectional views taken along line XI-XI and viewed in the direction shown by arrows in FIG. 10, illustrating how to place the pair of joint portions 36r, 36l on top of each other. In this case, the joint portions 36r, 36l can be positioned in the longitudinal direction of the vehicle by merely moving the joint portion 36l of the left bracket half 32 toward the joint portion 36r of the right bracket half 34, inserting the joint portion 36l between the restricting walls 62, 64 provided on both sides of the joint portion 36r, and placing the joint portion 36l on the joint portion 36r so as to surface contact the joint portion 36r. The restricting walls 62, 64 are tilted outward so that the distance therebetween increases toward the distal ends of the restricting walls 62, 64. The joint portion 36l is guided and positioned by the restricting walls 62, 64.

The present embodiment has functions and effects similar to those of the embodiment shown in FIG. 8. In particular, since the joint portion 36l is positioned by being sandwiched between the pair of restricting walls 62, 64, the joint portions 36r, 36l can be easily and accurately positioned relative to each other in the longitudinal direction of the vehicle.

Figure 12:
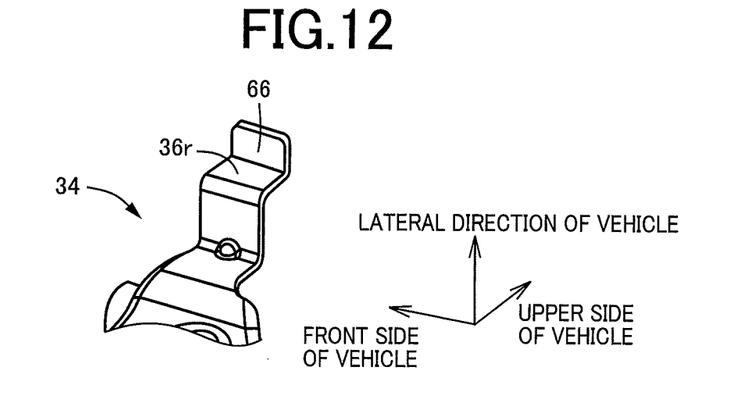
FIG. 12 is a perspective view corresponding to FIG. 8, illustrating a still further example of the joint portion provided in the right bracket half of the present invention.

FIG. 12 is a perspective view corresponding to FIG. 8. In this embodiment, a restricting wall 66 bent toward the left bracket half 32 is provided along the distal end edge of the joint portion 36r which extends in the longitudinal direction of the vehicle. Accordingly, the joint portions 36r, 36l can be easily positioned in the vertical direction of the vehicle by placing the joint portion 36l of the left bracket half 32 on the joint portion 36r so as to surface contact the joint portion 36r and sliding the joint portion 36l along the surface of the joint portion 36r to bring the joint portion 36l into contact with the restricting wall 66. This embodiment thus has functions and effects similar to those of the embodiment shown in FIG. 8.

Figure 13:
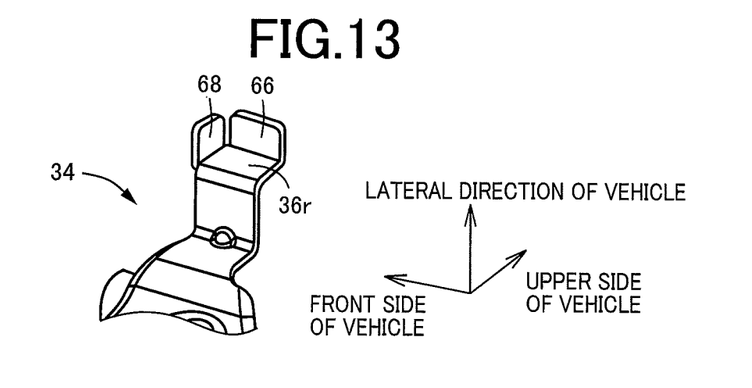
FIG. 13 is a perspective view corresponding to FIG. 8, illustrating a yet further example of the joint portion provided in the right bracket half of the present invention.

In FIG. 13, the restricting wall 66 is provided along the distal end edge of the joint portion 36r which extends in the longitudinal direction of the vehicle, as in the embodiment of FIG. 12. Moreover, a restricting wall 68 is provided along one edge of the joint portion 36r which extends in the vertical direction of the vehicle, as in the embodiment of FIG. 8. Accordingly, in this case, the joint portions 36r, 36l can be easily positioned in the vertical and longitudinal directions of the vehicle by placing the joint portion 36l of the left bracket half 32 on the joint portion 36r so as to surface contact the joint portion 36r and sliding the joint portion 36l along the surface of the joint portion 36r to bring the joint portion 36l into contact with the restricting walls 66, 68.

The embodiments of FIGS. 8 to 13 are described with respect to the case where the joint portion 36r of the right bracket half 34 has the restricting wall 60 etc. However, the joint portion 36l of the left bracket half 32 may have the restricting wall 60 etc. Both of the joint portions 36r, 36l may have the restricting wall 60 etc. so that the restricting walls 60 etc. of the joint portions 36r, 36l do not interfere with each other. The other joint portions 38, 40 may also have a similar restricting wall. A plurality of restricting walls may be dispersedly provided in the three joint portions 36, 38, 40.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS

10: vehicle operation pedal device 12: operation pedal 20: support pin 24: pedal bracket 26: vehicle body 32: left bracket half 34: right bracket half 36, 38, 40: joint portions 44, 46: attachment portions 60, 62, 64, 66, 68: restricting wall

The invention claimed is:

1. A vehicle pedal bracket, including first and second bracket halves that are disposed on right and left sides of an operation pedal, the first and second bracket halves including a plurality of joint portions extending parallel to each other and joining together the first and second bracket halves, each joint portion comprising first and second joints positioned on top of each other so that the first and second joints of each joint portion surface contact each other, and the vehicle pedal bracket being fixed to a vehicle body via a first attachment portion of the first bracket half and a second attachment portion of the second bracket half, each of the first and second joints protruding from a respective one of the first and second bracket halves formed by a sheet material, at least one of the first and second joints of each joint portion extending from the respective one of the first and second bracket halves in a bent shape, and the first and second joints being placed on top of each other so as to surface contact each other in each respective joint portion, the first and second joints of at least a first joint portion of the plurality of joint portions being located below the first and second attachment portions in a vertical direction of a vehicle, and the first and second joints of at least a second joint portion of the plurality of joint portions being located above the first and second attachment portions in the vertical direction of the vehicle, and the first and second joints of the first joint portion located below the first and second attachment portions being provided so as to protrude toward the front of the vehicle.

2. The vehicle pedal bracket according to claim 1, wherein at least one of the first and second joints of each joint portion has a restricting wall that is bent toward the other of the first and second joints and that is engaged with the other of the first and second joints to position the first and second joints.

3. A vehicle operation pedal device including the vehicle pedal bracket according to claim 1 and a support pin that is disposed so as to penetrate the pair of first and second bracket halves of the vehicle pedal bracket, the operation pedal being pivotally disposed about an axis of the support pin.

4. The vehicle pedal bracket according to claim 1, wherein the first and second joints of the first joint portion located below the first and second attachment portions are provided at a position closer than the first and second attachment portions to the front of the vehicle.

* * * * *